United States Patent [19]

Pike

[11] Patent Number: 5,048,624

[45] Date of Patent: Sep. 17, 1991

[54] ADJUSTABLE LOAD ARRESTOR FOR WEIGHING APPARATUS

[75] Inventor: Timothy D. Pike, Castro Valley, Calif.

[73] Assignee: F.M.E. Corporation, Hayward, Calif.

[21] Appl. No.: 628,302

[22] Filed: Dec. 14, 1990

[51] Int. Cl.$^5$ .................................... G01G 23/02
[52] U.S. Cl. ................................ 177/154; 177/238
[58] Field of Search ............... 177/154, 155, 156, 238, 177/239

[56] References Cited

U.S. PATENT DOCUMENTS

| | | | |
|---|---|---|---|
| 4,055,227 | 10/1977 | Brackett | 177/208 |
| 4,313,510 | 2/1982 | Tomlinson, Jr. | 177/165 |
| 4,361,199 | 11/1982 | Ulicny | 177/154 |
| 4,396,079 | 8/1983 | Brendel | 177/179 |
| 4,420,054 | 12/1983 | Caris | 177/154 |
| 4,497,386 | 2/1985 | Meier | 177/229 |
| 4,515,232 | 5/1985 | Rubinstein | 177/154 |
| 4,540,057 | 9/1985 | Freeman | 177/154 |
| 4,574,898 | 3/1986 | Freeman | 177/154 |
| 4,724,914 | 2/1988 | Liang | 177/187 |
| 4,726,435 | 2/1988 | Kitagawa et al. | 177/187 |

*Primary Examiner*—Benjamin R. Fuller
*Assistant Examiner*—Randy W. Gibson
*Attorney, Agent, or Firm*—Townsend and Townsend

[57] ABSTRACT

A load cell weighing apparatus (1) includes a base (7) and a load plate (11) and a load cell (9) mounted between the two. The base (7) includes four load arrestors (17) capable of precise adjustment. Each load arrestor (17) has a pin support (18) with three vertical holes (19) of different depths and a pin (21) which is placed in one of the holes (19). The load arrestors (17) prevent damage to the load cell (9) by limiting vertical movement of the load plate (11) with respect to the base (9). The amount of relative movement is easily and quickly adjusted by simply repositioning the pins from holes of one depth to holes of another depth.

17 Claims, 2 Drawing Sheets

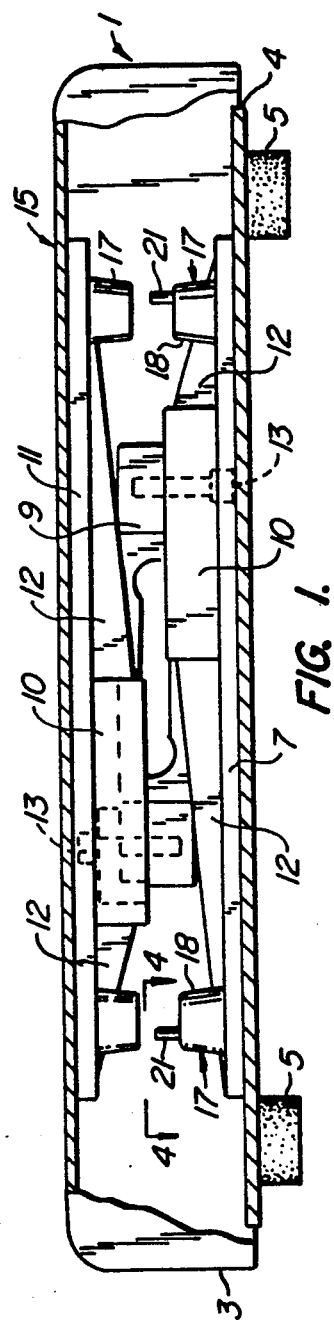
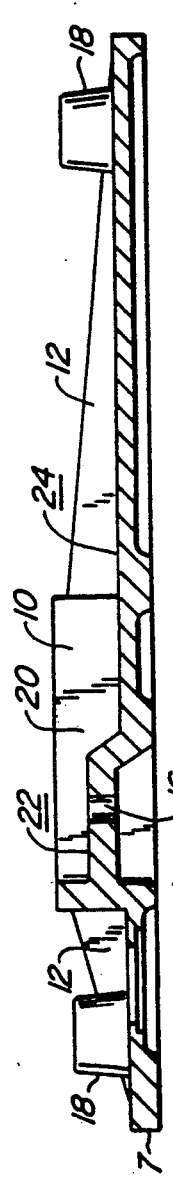
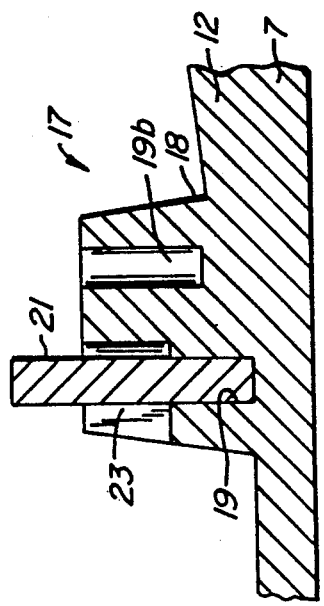
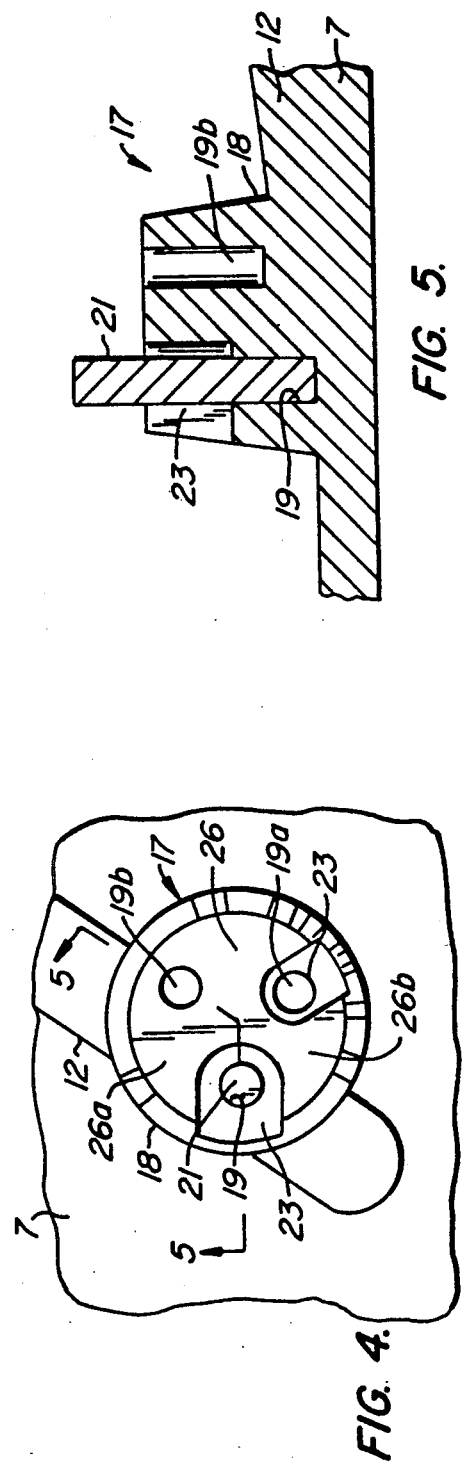

ADJUSTABLE LOAD ARRESTOR FOR WEIGHING APPARATUS

BACKGROUND OF THE INVENTION

The present invention relates to a load cell weighing apparatus. More particularly, it relates to a weighing apparatus having adjustable load arrestors that can protect various capacity load cells against excessive loads.

Load cells are commonly used in scales because they offer many advantages in comparison to spring and balance scales. For instance, they provide an electrical output which is readily adaptable to the electronics of computing scales. Typically, an electrical detection of the deformation of the load cell is used to determine the weight of the load placed on the scale. Load cells, however, have a disadvantage in that they are easily damaged by overloads and shockloads. Thus, it is necessary to provide overload and shockload protection for load cells in the form of stops, or load arrestors, which limit the deflection of the load cell under a load.

Since different capacity load cells tend to vary slightly in stiffness, it is generally necessary to provide means for the overload protection stops provided in a scale. Further, since full scale deflection is on the order of thousandths of an inch, such adjustments are delicate and particularly difficult to make. In the prior art, the deflection distance is adjusted by adjusting a bolt threaded into the base beneath the load cell. The bolt is then secured with a lock nut to act as a down stop. This approach, however, has several problems. One problem is that securing the lock nut often disturbs the adjustment so that precision is lost. In addition, prior art screw stops require that the pieces be machined, which adds to the total cost of the scale. Thus, the prior art is lacking a simple, yet precise, adjustable load arrestor which is economical to manufacture and comprises a minimum of parts.

SUMMARY OF THE INVENTION

The present invention provides a weighing apparatus comprising a base and load plate either one, or both, of which are associated with adjustable load arrestors capable of precise adjustment. Each load arrestor includes a pin and a pin support having at least two vertical holes of different effective depths in which the pin is placed. The pin supports may project from the surface of the base or load plate; alternatively, the pin supports may be substantially flush with the surface.

There are usually three holes per pin support, preferably arranged in a triangular pattern, although the number of holes may be increased if greater range of capacities is desired. Each hole has a different effective depth so that the load arrestor can be precisely adjusted. The term "effective depth" refers to the actual depth of the surface which supports the pin placed in the hole. The full depth of the pin may be greater, if, for instance, the hole comprises a shoulder on which the pin rests. In addition, each hole is preferably counterbored, the counterbored region for each hole being of a different size so that the depth of each hole can be easily ascertained. Typically, the deepest hole has the largest counterbored region and the shallowest hole has the smallest counterbored region. Other means for quick and easy visual effective depth indicating the relative effective depths of the holes may be used as well.

The pins used with the load arrestors to adjust the maximum travel of the load plate are typically conventional dowels, which are commonly available, inexpensive and of accurate lengths. The cross-sectional dimensions and shape of the pins is not critical to the invention. They may have, for instance, a square, rectangular or circular cross section. Obviously, the shape of the holes need not correspond to the cross-sectional shape of the pin; for example, a round hole can be used with a triangular pin if desired. For instance, standard $\frac{1}{8}''\times 1''$ dowel pins may be conveniently used. Thus, replacement of lost or defective pins is not a serious concern because of their low cost and wide availability. The height of the load arrestor is quickly and easily adjusted by moving the pin from hole to hole, according to the desired degree of protection of the load cell. In addition, height of the load arrestor can be easily adjusted by using pins of different lengths in the same or different holes.

The pin supports are preferably precision cast as part of the base and load plate. The casting is preferably such that further machining of the holes is not necessary to provide precise adjustment.

Typically, both the load plate and the base will comprise a pin support at each corner. Typically, only the pin supports on the base include a pin in one of the holes, but those on the load plate may also include pins, if desired. Any pins in the load plate must fit snugly so that they do not fall or move in the hole due to gravity. It should be noted, however, that so long as the effective depth of the hole is greater than the distance between the end of the pin and the corresponding pin support, the pin will not be lost from a hole in either the load plate or the base. Thus, pins cannot be dislodged or lost during shipping. The pin supports on the load plate are oriented downwardly and are placed such that each overlies the corresponding upwardly oriented pin support on the base. The holes in the load plate pin supports are preferably arranged such that they do not coincide with the holes of the corresponding base pin support. Thus, each pin is aligned with one of the lands between the holes and contacts this portion of the corresponding pin support when an excessive load is placed on the scale.

The base and load plate may be formed according to any method known in the art such as machining, stamping, casting and the like. The pieces are preferably formed by precision casting so that they may be manufactured inexpensively, without the necessity of further machining. The base and load plate are preferably formed from identical castings. The identical casting should be designed such that the holes of opposing load arrestors do not coincide. The base and load plate can be formed of die cast metal, sheet metal, structural foam, or the like. The base and load plate are typically formed to accommodate standard sized load cells.

The primary advantage of the preferred embodiment of the present invention is the extreme simplicity of the manufacturing steps required to produce the functional pieces. Since load cells of different weight ranges typically have the same dimensions, the bases and load plates can be used in a variety of products without further adaptation. The only adjustment required is the placement of the pin in the hole of the desired depth. Essentially the only manufacturing step required is the precision casting of a single piece, which functions as the base in one orientation and the load plate in another. The other components, the load cell and pins, are readily available and can be used without modification in the form in which they are purchased.

Other advantages of the present invention will be apparent to those skilled in the art from consideration of the detailed description of embodiments of the subject invention set forth below and of the attached drawings.

BRIEF DESCRIPTION OF THE DRAWINGS

FIG. 1 is a longitudinally sectional view of a complete weighing apparatus of an embodiment of the present invention.

FIG. 3 is a cross section of the casting of FIG. 2, taken along line 3—3.

FIG. 4 is a top view of a load arrestor of FIG. 1.

FIG. 5 is a cross section of the load arrestor of FIG. 3, taken along line 5—5.

DETAILED DESCRIPTION OF THE PREFERRED EMBODIMENT

Figure 2:
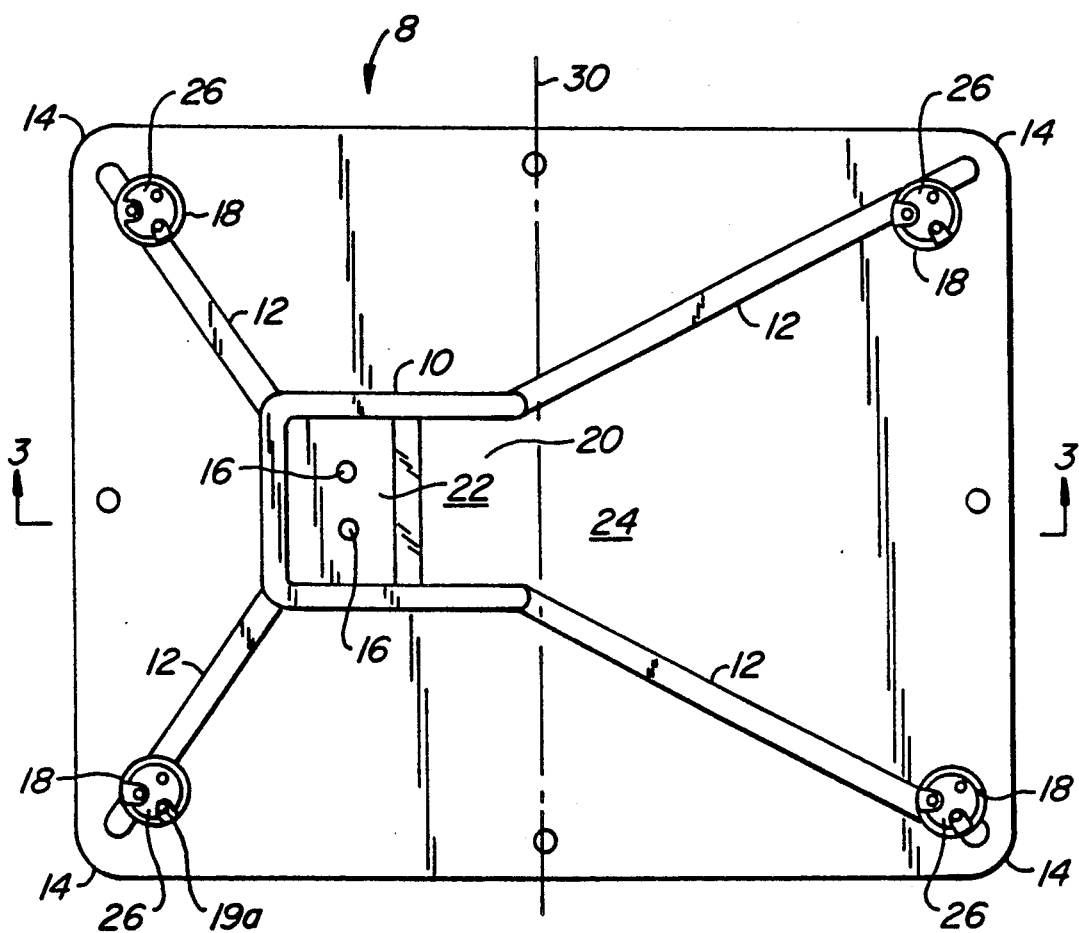
FIG. 2 is an enlarged top view of precision casting used as both the base and the load plate in the weighing apparatus of FIG. 1.

Referring the reader now to FIG. 1, a weighing apparatus 1 made according to the present invention includes a rectangular base platform 4, to which four feet 5 are attached adjacent each corner. A base 7 is mounted on the base platform 4 using, for example, screws (not shown). A load cell 9 is mounted to the base 7 by pair of fasteners 13, preferably screws. The load cell 9 is typically load cell Model No. 1015F15-505 manufactured by Tedia, Inc. (Canoga Park, Calif.). A load plate 11 is placed on the load cell 9 and is mounted to the load cell 9 by a pair of fasteners 13 in the same manner as the base 4 and load cell 9 are mounted together. The load plate 9 and base 7 are preferably identical precision castings which require no further machining. A protective cover 3 is then placed over the assembly comprising the base 9, load cell 9, and load plate 11. The cover 3 includes a load bearing surface 15, which is associated with the load plate 11, and on which the object to be weighed is placed.

FIGS. 2 and 3 show a precision casting 8 that can be used for both base 7 and load plate 11. The casting 8 can be seen to comprise a raised ridge 10 which forms a cavity 20 in which the load cell 9 is mounted by fasteners 13 which pass through fastener holes 16. When the load cell 9 is mounted on the casting it rests on raised surface 22 and not on main surface 24 of the casting 8. In the assembled weighing apparatus, the end of the load cell 9 which projects out from the cavity 20 contacts the raised surface 22 of the opposing casting 8 in the same manner. Structural ridges 12 provided added strength to the casting 8. A pin support 18 is positioned adjacent each corner 14 of the casting 8. The castings 8 are formed such that the casting is simply rotated 180° along its transverse axis 30 to be used as both a base 7 and load plate 11. Thus, the longitudinal symmetry of the casting is exploited to allow coincidence of the pin supports. Asymmetry of the pin supports, however, prevents coincidence of the holes in overlying pin supports.

FIGS. 4 and 5 show that each load arrestor 17 comprises a pin support 18 having three holes 19, 19a, and 19b, each hole having a different effective depth. Between the holes 19, 19a and 19b are lands 26, 26a, and 26b that contact the pin 21 of the corresponding pin support 18. In particular, a pin 21 placed in hole 19 of pin support 18 on base 7 will contact land 26 on the overlying pin support 18 on the load plate 11. Similarly, a pin 21 placed in holes 19a or 19b will contact lands 26a or 26b, respectively. The holes are cast so as to accept a standard ⅛"×1" dowel pin. Each hole 19 has a counterbored region 23, the size of which varies with the depth of the hole 19. Typically, the deepest hole will have the largest counterbored region whereas the shallowest hole 19 will have no counterbored region.

In the typical operation, a pin 21 is placed in one of the holes 19, 19a or 19b of the pin support 18 of each of the four load arrestors 17 in the base 7. The effective depth of the holes 19, 19a or 19b determines the degree of movement of the load plate 11 with respect to the base 9. If the maximum travel of load plate 11 is to be changed, pins 21 are simply placed in a different hole. Alternatively, different length pins 21 can be placed in the same or a different hole.

The above description of the embodiments of the invention and the attached drawings are provided by way of illustration only. Numerous other embodiments will be apparent to one of skill in the art. Thus, limitations on the scope of the subject invention are to be found only in the claims set forth below.

What is claimed is:

1. A weighing apparatus comprising:
   a base;
   a load cell mounted on the base;
   a load plate mounted on the load cell;
   a load arrestor associated with at least one of the base and load plate, the load arrestor including a pin support and a pin, the pin support having at least two vertical holes of different effective depths, and the pin being placed in a hole of the pin support;
   a load bearing surface associated with the load plate for receiving an object to be weighed; and
   a portion of the load plate overlying the load arrestor so that vertical movement of the load plate is limited by the load arrestor.

2. A weighing apparatus of claim I wherein the load arrestor is associated with the base.

3. A weighing apparatus of claim 2 wherein the pin support projects upwardly.

4. A weigh apparatus of claim 1 wherein the pin support includes three holes of three different effective depths.

5. A weighing apparatus of claim 4 wherein the holes are arranged in a triangular pattern.

6. A weighing apparatus of claim 1 wherein the pin support further comprises a counterbored region around each hole, the counterbored region for each hole being of a different size.

7. A weighing apparatus of claim 6 wherein the deepest hole has the largest counterbored region and the shallowest hole has no counterbored region.

8. A weighing apparatus of claim 1 wherein the base and load plate are formed by precision casting.

9. A weighing apparatus of claim 1 wherein the base and load plate are identical.

10. A weighing apparatus of claim 9 wherein the portion of the load plate overlying the load arrestor includes a second pin support.

11. A weighing apparatus of claim 11 wherein the holes of the second pin support are arranged such that they do not coincide with the holes of the pin support on the base.

12. A weighing apparatus comprising:
   a rectangular base having a load arrestor adjacent each corner, each load arrestor including a pin support and a pin, the pin support having at least three vertical holes, each hole having a different depth, the pin being placed in one of the vertical holes;

a load cell mounted on the base;

a rectangular load plate mounted on the load cell, the load plate comprising a pin support surface adjacent each corner, each pin support surface positioned so as to overlie a base pin support so that movement of the load plate towards the base is limited by the pins contacting the pin support surfaces; and a load bearing surface, associated with the load plate, for receiving an object to be weighed.

13. A method of manufacturing a weighing apparatus comprising the steps of:

providing a load cell and a pin;

forming a base and a load plate, at least one of the base and load plate being associated with a pin support, the pin support having at least two vertical holes;

sizing the holes to accept the pin, the holes being of different effective depths;

mounting the load cell between the base and the load plate; and placing the pin in one of the holes in the pin support such that vertical movement of the base and of the load plate with respect to each other is limited.

14. A method of claim 13 wherein the step of forming is carried out by casting two identical forms.

15. A method of manufacturing a weighing apparatus comprising the steps of:

providing a load cell and at least one pin;

forming two identical, substantially flat forms, each having a pin support having at least two vertical holes;

sizing the holes to accept the at least one pin, the holes being of different effective depths;

mounting the load cell between the two forms; and placing a pin in one of the holes in the pin support of one of the forms such that vertical movement of the two forms with respect to each other is limited.

16. A method of claim 15 wherein the step of forming is carried out by casting two identical, substantially flat, rectangular forms, each having a pin support adjacent each corner.

17. A method of claim 15 wherein the step of forming includes the step of forming a visual depth indication at least one of said holes.

* * * * *